US008480460B2

(12) United States Patent
Schwarz

(10) Patent No.: US 8,480,460 B2
(45) Date of Patent: Jul. 9, 2013

(54) CABIN AIR SUPERCHARGED AIRCRAFT INTERNAL COMBUSTION ENGINE

(75) Inventor: Frederick M. Schwarz, Glastonbury, CT (US)

(73) Assignee: United Technologies Corporation, Hartford, CT (US)

(*) Notice: Subject to any disclaimer, the term of this patent is extended or adjusted under 35 U.S.C. 154(b) by 1395 days.

(21) Appl. No.: 11/906,296

(22) Filed: Oct. 1, 2007

(65) Prior Publication Data

US 2009/0088063 A1 Apr. 2, 2009

(51) Int. Cl.
*B64D 13/00* (2006.01)
*F01B 29/04* (2006.01)

(52) U.S. Cl.
USPC ............... 454/76; 454/70; 454/255; 60/706; 60/712; 290/1 A; 123/179.19; 123/565

(58) Field of Classification Search
USPC . 454/70, 76, 255; 60/706, 712, 785; 123/565, 123/179.19
See application file for complete search history.

(56) References Cited

U.S. PATENT DOCUMENTS

| | | | | |
|---|---|---|---|---|
| 1,752,015 A | * | 3/1930 | Martin, Jr. | 62/56 |
| 2,463,828 A | * | 3/1949 | Trisler | 123/559.1 |
| 2,537,694 A | * | 1/1951 | Oaks | 123/41.42 |
| 4,098,077 A | * | 7/1978 | Edmaier et al. | 60/272 |
| 4,257,554 A | * | 3/1981 | Willingham | 236/35 |
| 4,418,879 A | * | 12/1983 | Vanderleest | 244/53 B |
| 4,419,926 A | * | 12/1983 | Cronin et al. | 454/74 |
| 4,506,594 A | * | 3/1985 | Rowland et al. | 454/74 |
| 4,651,728 A | * | 3/1987 | Gupta et al. | 128/201.28 |
| 4,706,908 A | * | 11/1987 | Huffman et al. | 454/74 |
| 5,722,229 A | * | 3/1998 | Provost | 60/728 |
| 6,278,262 B1 | * | 8/2001 | Ullyott | 322/22 |
| 6,382,556 B1 | * | 5/2002 | Pham | 244/6 |
| 6,401,473 B1 | * | 6/2002 | Ng et al. | 454/76 |
| 6,508,060 B2 | * | 1/2003 | Clemens et al. | 60/670 |
| 6,536,207 B1 | * | 3/2003 | Kamen et al. | 60/517 |
| 6,651,929 B2 | * | 11/2003 | Dionne | 60/39.08 |
| 6,942,181 B2 | * | 9/2005 | Dionne | 60/39.08 |
| 7,049,707 B2 | * | 5/2006 | Wurtele | 290/1 A |
| 7,111,592 B1 | * | 9/2006 | Kern et al. | 290/1 B |
| 7,245,033 B2 | * | 7/2007 | Wurtele | 290/1 A |
| 7,485,981 B2 | * | 2/2009 | Schwarz et al. | 290/52 |
| 7,611,093 B2 | * | 11/2009 | Campbell et al. | 244/58 |
| 7,690,188 B2 | * | 4/2010 | Schwarz et al. | 60/224 |
| 7,690,189 B2 | * | 4/2010 | Schwarz et al. | 60/224 |
| 7,707,838 B2 | * | 5/2010 | Sheldon et al. | 60/785 |
| 7,762,056 B2 | * | 7/2010 | Schwarz et al. | 60/782 |

(Continued)

FOREIGN PATENT DOCUMENTS

GB 2074654 A * 11/1981

*Primary Examiner* — Kang Hu
*Assistant Examiner* — Phillip E Decker
(74) *Attorney, Agent, or Firm* — Kinney & Lange, P.A.

(57) ABSTRACT

An aircraft having a user region therein within which pressurized air at selected pressures can be maintained using an environmental control system provided in the aircraft, and a utility region outside a utility boundary wall of the user region within which selected equipment for the aircraft is located. An internal combustion engine, provided as an intermittent combustion engine, is provided in the utility region having an air intake coupled to combustion chambers therein and a rotatable output shaft also coupled to those combustion chambers for generating force with an air transfer duct extends between the user region and the air intake so as to be capable of conveying pressurized air to that air intake.

13 Claims, 1 Drawing Sheet

U.S. PATENT DOCUMENTS

| | | | |
|---|---|---|---|
| 7,836,680 B2 * | 11/2010 | Schwarz et al. | 60/785 |
| 2006/0016196 A1 * | 1/2006 | Epstein | 60/773 |
| 2006/0071123 A1 * | 4/2006 | Nguyen et al. | 244/76 R |
| 2006/0102779 A1 * | 5/2006 | Campbell et al. | 244/53 B |
| 2008/0057848 A1 * | 3/2008 | Gray et al. | 454/69 |
| 2008/0098747 A1 * | 5/2008 | Sheldon et al. | 60/802 |
| 2008/0209911 A1 * | 9/2008 | Schwarz et al. | 60/785 |
| 2008/0245062 A1 * | 10/2008 | Dionne | 60/770 |
| 2009/0025393 A1 * | 1/2009 | Sheldon et al. | 60/725 |
| 2010/0013242 A1 * | 1/2010 | Schwarz et al. | 60/706 |
| 2010/0326753 A1 * | 12/2010 | Garside | 180/65.245 |
| 2011/0183595 A1 * | 7/2011 | Liebich | 454/70 |
| 2012/0153076 A1 * | 6/2012 | Burns et al. | 60/785 |

* cited by examiner

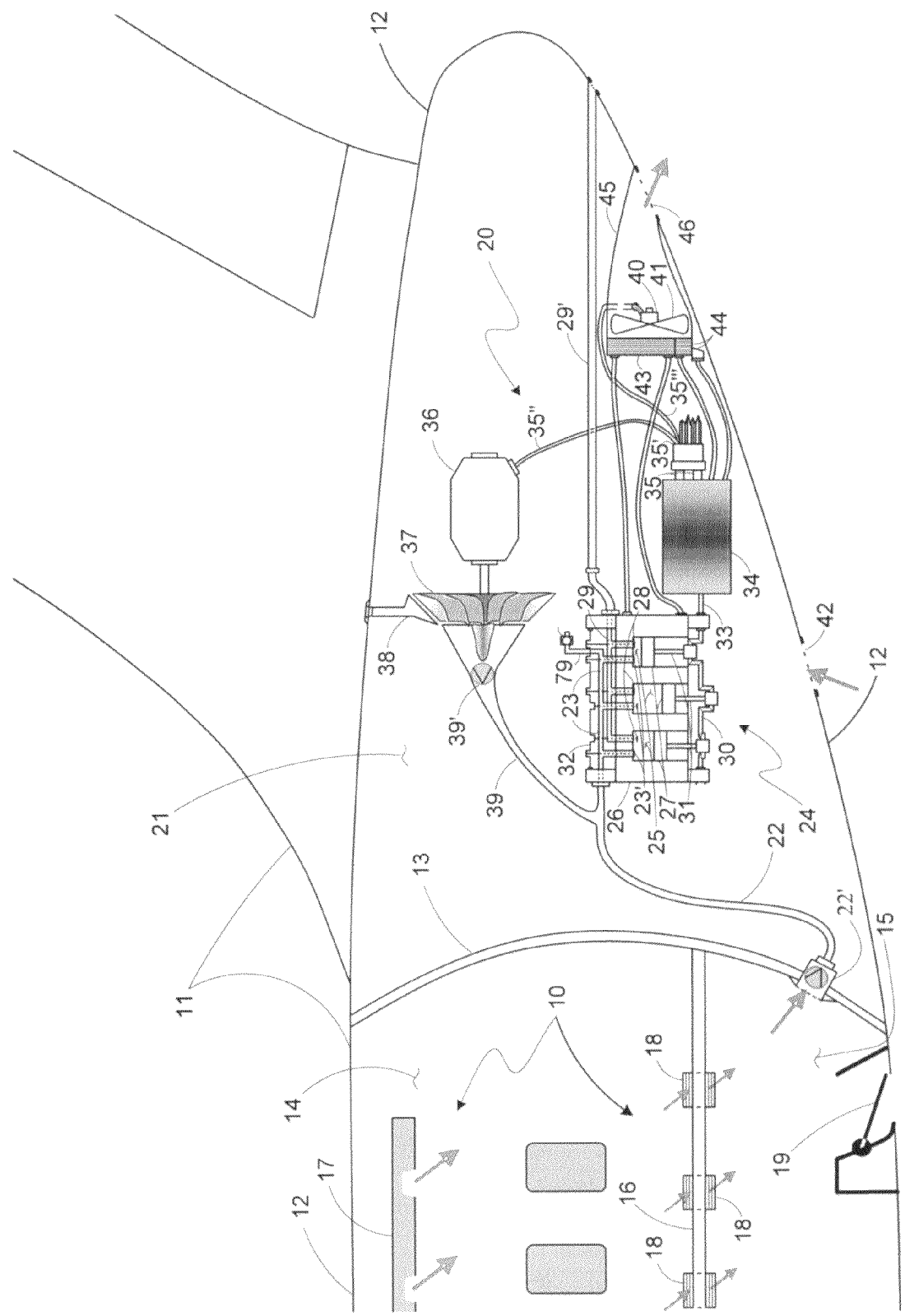

CABIN AIR SUPERCHARGED AIRCRAFT INTERNAL COMBUSTION ENGINE

CROSS-REFERENCE TO RELATED APPLICATION

Referenced herein is U.S. application Ser. No. 11/713,262 filed Mar. 2, 2007 for "COMBINATION ENGINES FOR AIRCRAFT" by Frederick M. Schwarz, Brian M. Fentress, Andrew P. Berryann, Charles E. Lents and Jorn A. Glahn.

BACKGROUND

The present invention relates to gas turbine engines for aircraft and, more particularly, to gas turbine engines each coupled to a corresponding auxiliary engine.

Gas turbine engines as continuous combustion, open Brayton cycle internal combustion engines have come to dominate as the power plants for larger, faster aircraft to essentially the exclusion of reciprocating engines, or internal, intermittent combustion engines, earlier used as power plants for these kinds of aircraft. This is largely because of the greater power-to-weight ratio of gas turbine engines versus internal combustion engines, especially in large horsepower engines, or, more appropriately, large thrust engines in which those large thrusts are provided with a relatively small, and so smaller drag, frontal area engine structures relative to reciprocating engines. Gas turbine engines generate such large thrusts for propulsion, or horsepower for engines with an output shaft, by combining large volumes of air with large amounts of fuel, and thereby form a jet of large velocity leading to the capability to provide desired speedy flights.

In addition to providing thrust, such gas turbine engines have operated integrated drive generators to generate electricity for the aircraft and for the engine electronic controls. The amount of electricity needed for these purposes in the past has tended to be relatively modest typically in the range of a few hundred kilowatts of electrical power but, with recently arriving new aircraft, exceeding a megawatt of power. However, there are some aircraft, usually for military uses, that have come to have needs for still larger amounts of electrical power either on a relative basis, the electrical power needed relative to the capability of the gas turbine engine available, or on an absolute basis with power needs significantly exceeding a megawatt. Furthermore, such demands for electrical power in military aircraft often occur at relatively high altitudes and often occur unevenly over relatively long time durations of use, that is, large peaks repeatedly occur in electrical power demand in the course of those long use durations.

Corresponding attempts to obtain the added power from the typical aircraft propulsive system, the gas turbine engine, that are needed to operate the concomitant much larger capacity electrical generators, either on a relative or absolute basis, will subtract significantly from the thrust output of the available turbine or turbines. Making up that thrust loss in these circumstances by operating such available turbine engines so as to increase the thrust output thereof causes the already relatively low fuel use efficiency during flight to decrease significantly which can severely limit the length of otherwise long duration uses, and also brings those engines closer to becoming operationally unstable.

Of course, such problems could be avoided by providing a gas turbine engine of greater thrust capability than is needed to propel the aircraft to thereby provide adequate capacity for generating needed electrical power. However, if that needed power is not needed on a fairly constant basis to propel the aircraft, such a gas turbine engine will often be operating very far from its optimal operating point as it propels the aircraft, and this leads to significantly degraded fuel efficiency thereby limiting the duration of flight in an aircraft using such an engine.

Another possibility is the addition of a further small auxiliary gas turbine engine for operating the electrical power generator to provide the needed electrical power. Again, however, for uneven electrical power demands over time, the engine will either be have to be oversized or will be operated inefficiently in meeting the power peak demands and with operating excursions bringing it near to becoming unstable. Even more important, this small auxiliary engine will have poor fuel consumption because the fuel consumption performance of all turbomachinery worsens as it is scaled down since high loss boundary layer flows and tip clearance flows represent a larger fraction of the total fluid flow of the smaller engine.

In the situation of a relatively small aircraft being selected with a small gas turbine engine for propulsion to provide relatively good fuel consumption at altitude and so long flight endurance, the aircraft would need to have a large wing area and high lift devices, and would have to be operated from long runways. However, the endurance problem is still not satisfactorily solved because such engines do not scale down to small sizes so as to maintain the fuel use efficiencies for power generation and, of course, are limited by instability of the compressor in the peaks of electrical power they can supply.

From the foregoing, gas turbine engines used to propel aircraft can be seen to not be well suited as energy sources for also operating electrical power generators that are required to deliver large quantities of electrical power, especially in situations in which the quantities demanded of that power change substantially over time or in which those quantities must be delivered over long time durations, or both. A more effective alternative is to use a different kind of engine to serve as the energy source for such electrical power generators that is both substantially more fuel efficient and operates stably over a wide range of output powers. Thus, intermittent combustion internal combustion engines can be used, such as gasoline engines operating on the any of the Diesel, Miller, Otto or Wankel cycles.

Such engines can operate with a fuel efficiency on the order of seventy percent (70%) better than that of a continuous combustion (Brayton cycle) internal combustion gas turbine engine. Furthermore, this better fuel efficiency of these engines is essentially maintained over a wide range of engine output powers in contrast to the significant fuel efficiency decreases that occur in gas turbine engines if operated away from their optimum operating points. Although such intermittent combustion engines are heavy relative to the output power they provide, they can be relatively small if used primarily for energizing electrical power generators in an aircraft, rather than for propulsion of that aircraft, and can thus be positioned in the aft part of the fuselage past the cabin pressure bulkhead where, typically, auxiliary power units are housed in commercial airliners.

At high altitudes, however, internal combustion engines of all kinds face the possibility of limited power output because of the relatively small air pressures there limiting the number of chemical reactions of oxygen with hydrogen and oxygen with carbon in the burning the engine fuel in the engine combustion chamber or chambers. Gas turbine engines do provide therein very large air flows through use therein, typically, of axial flow compressors to supply compressed air to the subsequent combustor sufficient to sustain the desired combustion process therein. However, such compressors can provide considerably more compressed air than the minimum needed for this purpose thereby allowing some of this compressed air to be delivered through an air transport duct to the air intake of an intermittent combustion internal combustion engine so that, in effect, the compressors of the gas turbine engine serve as a very capable supercharger for that intermittent combustion engine. The usual mounting positions for propulsion gas turbine engines on passenger or cargo aircraft, at least larger ones, are typically under the wings. This arrangement would thereby require an air transport duct to extend from the compressors therein to the aft part of the aircraft fuselage to supply compressed air to an intermittent combustion engine located there which would be both expensive and require aircraft design compromises. Thus, there is a desire to find a more effective and economical source of pressurized air for operating an intermittent combustion internal combustion engine in an aircraft.

SUMMARY

The present invention provides an aircraft having a user region therein bounded at least in part by boundary walls within which pressurized air at selected pressures can be maintained using an environmental control system provided in the aircraft, and a utility region outside a utility boundary wall of the user region within which selected equipment for the aircraft is located. An internal combustion engine, provided as an intermittent combustion engine, is provided in the utility region having an air intake coupled to combustion chambers therein and a rotatable output shaft also coupled to those combustion chambers for generating force. An air transfer duct extends between an opening in the utility boundary wall, so as to be capable of having pressurized air in the user region enter that air transfer duct at one end thereof, and the air intake at an opposite end thereof so as to be capable of conveying pressurized air therein to that air intake.

BRIEF DESCRIPTION OF THE DRAWINGS

FIG. 1 is a schematic representation of a cross section side view of a portion of an aircraft embodying the present invention.

DETAILED DESCRIPTION

Passenger and cargo aircraft flights at substantial altitudes require that the cabins for passengers, and the cargo spaces also, have the air therein maintained at temperatures and pressures sufficient to keep passengers both alive and reasonably comfortable. Thus, in gas turbine engine propelled aircraft, compressed (and therefore hot) air is typically drawn from a low or intermediate stage of compression in such engines and supplied to an air cycle machine in the aircraft used as a refrigeration device in the aircraft cabin and cargo space environmental control system. In an alternative, rather than taking pressurized air from the propulsion turbine engines, that pressurized air can be instead provided by one or more dedicated air compressors to maintain such cabin and cargo space air pressure. Each such compressor has its rotors rotated for compressing air by a corresponding electric motor that is supplied electrical power from electrical generators integrated with the propulsion turbine engines. Either arrangement has a corresponding control system that supplies cooled, pressurized air, drawn from the atmosphere through the engines or dedicated compressors, respectively, to the cabin and cargo space of the aircraft. This atmosphere based air is conditioned in the environmental control system and then mixed in some fraction with recirculated cabin air in a mix manifold in the aircraft, and the result is supplied to both the aircraft cabin and cargo space as the basis for maintaining desired pressures and temperatures therein.

Cabin and cargo space pressures are maintained by delivering the mixed atmosphere based and recirculation based air to the aircraft cabin and cargo space at pressures exceeding that desired to be maintained the cabin and cargo space, and then having the cabin pressure control system repeatedly measure various relevant conditions to determine how much air to allow to continuously escape from those aircraft locations to the external atmosphere as the basis for setting the air pressures resulting at such locations. The cabin and cargo space air is allowed to escape to the atmosphere through a pressure outflow, or regulating, valve located in the lower aft part of the fuselage as the air escape mechanism to thereby reach the desired air pressure.

Thus, providing sufficient added pressure in the air delivered to the cabin and cargo space can thereby allow a portion of that cabin and cargo space pressurized air, which would otherwise be allowed to escape to the atmosphere, to instead be conveyed to an intermittent combustion engine in the aft part of the fuselage just behind the cabin pressure bulkhead from the cabin and cargo space. That is, the cabin and cargo space and the environmental system therefor together can be operated as a supercharger supplying compressed air to the intermittent combustion engine provided to operate an electrical generator primarily supplying electrical power for the aircraft. Whatever further portion of the pressurized cabin and cargo space air that is not needed for operation of the intermittent combustion engine, and so must still be jettisoned to the atmosphere to properly maintain air pressure in the cabin and cargo space, is allowed to escape through the pressure regulating valve by the cabin pressure control system.

Such an arrangement is shown in a schematic representation of a cross section side view of an aft portion of an aircraft in FIG. 1. The passenger and cargo space portion of an environmental control system, 10, is shown there for a passenger airliner, 11. A fuselage, 12, of airliner 11 has a cabin pressure bulkhead, 13, that separates a portion of this fuselage from both a passenger cabin, 14, and a cargo space, 15, that, in turn, are separated from one another by a cabin floor, 16. Environmental control system 10 (not shown for the most part) supplies pressurized air to passenger cabin 14 from a mix manifold therein (not shown) through a cabin air distribution manifold, 17, thereof (only partially shown) under control of a computer (not shown) at selected pressures and temperatures. Some of this air, so supplied, is drawn through cabin wall vents, 18, (only a few of them provided in the aircraft being shown) of this control system each having an opening located just above cabin floor 16 to a duct in that wall leading to an opening at the opposite end thereof in cargo space 15 located just below cabin floor 16. Environmental control system also has a pressure regulating valve, 19, that operates under control of the computer (again, not shown) to control the amount of air escaping to the atmosphere from cabin 14 and cargo space 15 thereby setting the selected air pressure therein.

An intermittent combustion engine operated electrical generation system, 20, is shown for passenger airliner 11 positioned in that aft fuselage portion, 21, (mounting means for system 20 in aft portion 21 not shown) that is located rearward of cabin 14 and cargo space 15 as separated therefrom by cabin pressure bulkhead 13. A further escape route for air in cabin 14 and cargo space 15 cabin is provided by a cargo space air duct, 22, in aft fuselage portion 21 into which air under pressure in cabin 14 and cargo space 15 can flow through an opening in cabin pressure bulkhead 13 and through a check valve, 22', mounted in that opening. Check valve 22' permits air to flow only from cargo space 15 into duct 22 and not in the reverse direction. This air flow in duct 22 is drawn therethrough by having the other end thereof connected to an air intake, or intake manifold, 23, leading to engine air intake valves, 23', for an intermittent combustion engine, 24, represented in the example of FIG. 1 by a schematic piston arrangement as a Diesel or Otto cycle engine but could alternatively be a Wankel engine.

Valves 23' in engine 24 control the air taken into combustion chambers, 25, bounded by an engine block, 26, providing the basic structure of engine 24, and by pistons, 27. Each chamber also has an exhaust valve, 28, through which combustion products are exhausted to an exhaust manifold, 29, that has an exhaust duct, 29, extending therefrom to an opening in fuselage 12 to convey this exhaust to the atmosphere outside the aircraft. A rotatable crankshaft, 30, has a connecting rod, 31, rotatably coupling it to a corresponding one of each of pistons 27. A rotatable camshaft, 32, is used to open and close air intake valves 23' and exhaust valves 28 in a suitable sequence.

Crankshaft 30, under the control of a system controller not shown, is rotated by the force on pistons 27 transmitted thereto by corresponding ones of connecting rods 31 due to repeated combustion events in the corresponding combustion chamber 25 which events occur in all of chambers 25 in a suitable sequence before repeating. These events correspondingly use the air quantities taken through valves 23' repeatedly into, and the fuel quantities repeatedly injected into, those chambers for combustion. The fuel quantities are injected by a fuel injection system not seeable in this FIGURE and the magnitudes thereof are used to select the mechanical power output of crankshaft 30 of the intermittent combustion engine. The resulting combustion products are correspondingly repeatedly rejected from those chambers through valves 28.

If an Otto cycle engine is used as intermittent combustion engine 24, the combustion events are initiated by the repeated sparkings of spark plugs not shown in this FIGURE in a suitable sequence across combustion chambers 25 under the control of the system controller. In addition, intermittent combustion engine 24 has a cooling system in which a coolant flows in passageways in engine block 26 (not shown) positioned adjacent to combustion chambers 25 for cooling the engine structure. The remainder of this cooling system is described below. Although the foregoing description is of an intermittent combustion engine employing pistons, other intermittent combustion engine types could alternatively be used such as one operating on the Wankel cycle.

Crankshaft 30 is suitably fastened to an input shaft, 33, of a primary electrical power generator, 34, to transmit the rotation of crankshaft 30 thereto. The resulting rotation of input shaft 33 electrically energizes output electrical conductors, 35, of generator 34 to thereby generate the desired electrical power thereat for operating aircraft devices (not or not all shown) connected thereto through a cable connector, 35', and the cables extending therefrom shown only partially except for two such cables, 35" and 35'". The demand for electrical power in the aircraft is used as a basis to select the fuel quantities injected in combustion chambers 25 of intermittent combustion engine 24 to have that engine supply sufficient mechanical power crankshaft 30 to sufficiently rotate input shaft 33 of generator 34 to meet that demand.

Cable 35" provides electrical power to an electrical motor, 36, that mechanically rotates an emergency supercharger impeller, 37, under the control of a computer not shown. Emergency supercharger fan 37 is to provide pressurized air to intake manifold 23 of intermittent combustion engine 24 in the event that cabin 14 and cargo space 15 should suffer a decompression event for some reason to thereby create such an emergency and deprive engine 24 of pressurized air from cabin 14 and cargo space 15. In such an unlikely event, supercharger 37 is likely to be necessary because the peak horsepower available from intermittent combustion engine 24 would be much less, or even perhaps this engine would not be capable of sustaining its operation at high altitudes. An emergency supply duct, 38, conveys air from the atmosphere between an opening in the wall of fuselage 12 and impeller 37. A supercharger duct, 39, conveys air from impeller 37 to cabin and cargo space air duct 22 connected to intake manifold 23 through a check valve, 39', to prevent air supplied through duct 22 from leaking out of the airliner 12 when impeller 37 is not operating.

The emergency system including motor 36 and emergency supercharger impeller 37 could be chosen to be eliminated in those situations in which electrical generators (not shown) are fully integrated with the gas turbine engines (not shown but typically mounted on the aircraft wings) used to propel airliner 11 so that they could be used to supply sufficient electrical power to operate the aircraft if intermittent combustion engine 24 fails in any manner. Also, as an alternative, this emergency system could be chosen to be replaced by a small "bleed" duct (not shown) extending from the compressors in the gas turbine engines (not shown but typically mounted on the aircraft wings) used to propel airliner 11 through computer controlled valves (not shown) to a connection with duct 22 to supply compressed air to intermittent combustion engine 24 following a cabin decompression event. In such an arrangement, these sources of compressed air can also provide compressed air to substitute for the pressurized air provided from the cabin and cargo space by duct 22 to thereby provide air at greater air pressures at intake 23 in situations of relatively large demands for electrical power.

Cable 35'" provides electrical power to an electrical motor, 40, that mechanically rotates a cooling fan, 41, under the control of a computer not shown, that are used for the remainder of the cooling system for intermittent combustion engine 24 and for cooling primary electrical power generator 34. Cooling fan 41 is operated to draw air from a vent, 42, in the wall of aft fuselage portion 21 through a pair of radiators, 43 and 44, which air, heated by these radiators, is then forced by this fan along a heat removal duct, 45, out a further vent, 46, in the wall of aft fuselage portion 21 into the atmosphere outside of airliner 11. A pair of hoses allows circulation of coolant between the passageways in engine block 26 of engine 24, indicated above, and radiator 43 to thereby cool that engine. Similarly, a pair of hoses allows circulation of oil used in electrical power generator 34 and radiator 44 to thereby cool that generator. Such cooling is primarily required when engine 24 and generator 34 are operated with airliner 12 on the ground and there is no cold atmosphere present about aft fuselage portion 21.

Although the present invention has been described with reference to preferred embodiments, workers skilled in the art will recognize that changes may be made in form and detail without departing from the spirit and scope of the invention.

The invention claimed is:
1. An aircraft having a user region therein bounded at least in part by boundary walls within which pressurized air at selected pressures can be maintained using an environmental control system provided in the aircraft, and a utility region outside a utility boundary wall of the user region within which selected equipment for the aircraft is located, the aircraft comprising:

an internal combustion engine provided as an intermittent combustion engine in the utility region having an air intake coupled to combustion chambers therein and a rotatable output shaft also coupled to those combustion chambers for generating force;

an air transfer duct extending between an opening in the utility boundary wall, so as to be capable of having pressurized air in the user region enter that air transfer duct at one end thereof, and also being connected to the air intake at an opposite end thereof so as to be capable of conveying pressurized air therein to that air intake;

a supercharger capable of receiving air from the atmosphere through an emergency supply duct located in the utility region and providing compressed air in a supercharger duct interconnected to the air transfer duct to provide the compressed air to the air intake of the intermittent combustion engine;

a radiator and a pair of hoses connected thereto and to coolant passageways in the intermittent combustion engine to allow circulation of a coolant between those passageways and the radiator to thereby cool that engine;

a radiator fan that is rotatable to draw air through the radiator;

a vent in the utility region through which the radiator fan draws air; and a heat removal duct extending from the radiator fan to an outlet vent in the utility region.

2. The aircraft of claim 1 wherein the user region has a passenger cabin and a cargo space therein.

3. The aircraft of claim 2 wherein the utility boundary wall is a cabin pressure bulkhead between the utility region and the user region.

4. The aircraft of claim 1 further comprising a primary electrical generator having a rotatable input shaft mechanically coupled through a coupler to the intermittent combustion engine output shaft and having an output conductor, the output conductor being electrically energized in response to rotation of the input shaft.

5. The aircraft of claim 1 wherein the supercharger duct is interconnected to the air transfer duct at a connection junction, there being a first check valve located between the utility boundary wall and the connection junction and a second check valve located between the supercharger and the connection junction with the first and second check valves each allowing air to flow in only one direction therethrough with that direction leading toward the intermittent combustion engine.

6. The aircraft of claim 4 wherein the supercharger is formed of a fan and an electric motor connected to the fan so as to be capable of rotating that fan, the electric motor being supplied electrical power by the primary electrical generator.

7. The aircraft of claim 4 further comprising a generator radiator and a pair of hoses connected thereto and to the primary electrical generator to allow circulation of a lubricant used in the primary electrical generator between that generator and the generator radiator to thereby cool that lubricant.

8. The aircraft of claim 7 wherein the radiator fan draws air through the engine radiator and the generator radiator.

9. An aircraft having:
a user region pressurized by an environmental control system;
a utility region having aircraft equipment;
a boundary wall separating the utility region from the user region;
an intermittent combustion engine in the utility region having an air intake and an output shaft;
an air transfer duct extending between an opening in the utility boundary wall to transfer pressurized air in the user region to the air intake;
an exhaust duct extending from the intermittent combustion engine to an opening in the aircraft to convey combustion products to the atmosphere outside the aircraft;
an electrical generator coupled to the output shaft;
an emergency supply duct located in the utility region to receive air from the atmosphere;
a supercharger duct connecting the emergency supply duct to the air transfer duct;
a supercharger disposed in the supercharger duct to provide compressed air to the air intake of the intermittent combustion engine;
an engine radiator coupled to the intermittent combustion engine to allow circulation of a coolant between the engine radiator and the intermittent combustion engine;
a fan rotatable by an electric motor to draw air through the engine radiator;
a vent in the utility region through which the radiator fan draws air; and
a heat removal duct extending from the radiator fan to an outlet vent in the utility region.

10. The aircraft of claim 9 wherein the supercharger comprises:
a fan; and
an electric motor connected to the fan and the electrical generator.

11. The aircraft of claim 9 and further comprising:
a generator radiator connected to the electrical generator to allow circulation of a coolant between the generator radiator and the electrical generator.

12. The aircraft of claim 11 wherein the fan is rotatable by the electric motor to draw air through the generator radiator.

13. A method for generating electrical power in an aircraft, the method comprising:
operating an environmental control system to provide pressurized air in a user region of the aircraft;
operating an intermittent combustion engine in a utility region of the aircraft using pressurized air from the user region that is passed through an air transfer duct connected to a boundary wall between the utility region and the user region;
driving an electrical generator with the intermittent combustion engine;
drawing electrical power from the electrical generator by aircraft operating devices in the aircraft;
rotating a supercharger fan drawing electrical power from the electrical generator to draw air from the atmosphere into an emergency supply duct connected to a supercharger duct within the utility region;
providing compressed air from the supercharger duct to the air transfer duct and the intermittent combustion engine;
rotating a radiator fan drawing electrical power from the electrical generator to draw radiator air from an inlet vent in the utility region through a radiator fluidly coupled to the intermittent combustion engine; and
forcing the radiator air through a heat removal duct extending from the radiator fan to an outlet vent in the utility region.

* * * * *